(12) United States Patent
Song et al.

(10) Patent No.: US 12,461,674 B2
(45) Date of Patent: Nov. 4, 2025

(54) MANY-CORE DEFINABLE DISTRIBUTED SHARED STORAGE STRUCTURE

(71) Applicants: BEIJING MICROELECTRONICS TECHNOLOGY INSTITUTE, Beijing (CN); BEIJING MXTRONICS TECHNOLOGY CO., LTD, Beijing (CN)

(72) Inventors: Liguo Song, Beijing (CN); Liang Wang, Beijing (CN); Lei Chen, Beijing (CN); Hui Qin, Beijing (CN); Hongchao Zheng, Beijing (CN); Tongde Li, Beijing (CN); Chunqing Yu, Beijing (CN)

(73) Assignees: BEIJING MICROELECTRONICS TECHNOLOGY ISTITUTE, Beijing (CN); BEIJING MXTRONICS TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 18/715,367

(22) PCT Filed: May 10, 2022

(86) PCT No.: PCT/CN2022/091905
§ 371 (c)(1),
(2) Date: May 31, 2024

(87) PCT Pub. No.: WO2023/097970
PCT Pub. Date: Jun. 8, 2023

(65) Prior Publication Data
US 2025/0028465 A1    Jan. 23, 2025

(30) Foreign Application Priority Data

Dec. 1, 2021 (CN) .......................... 202111452275.5

(51) Int. Cl.
*G06F 3/06* (2006.01)
(52) U.S. Cl.
CPC ............ *G06F 3/0635* (2013.01); *G06F 3/061* (2013.01); *G06F 3/0683* (2013.01)
(58) Field of Classification Search
CPC .......... G06F 3/0635; G06F 3/061; G06F 3/06; G06F 3/0683
See application file for complete search history.

(56) References Cited

U.S. PATENT DOCUMENTS 7,154,849 B2 * 12/2006 Yazaki .................... H04L 47/20
370/229
11,487,695 B1 * 11/2022 Radhakrishnan ... G06F 13/1626
(Continued)

FOREIGN PATENT DOCUMENTS

| CN | 105207957 A | 12/2015 |
| CN | 113704169 A | 11/2021 |
| CN | 114297097 A | 4/2022 |

OTHER PUBLICATIONS

K. Zhang and Y. Chu, "Design of Distributed Storage Multi-core System Based on NoC Architecture," 2019 3rd International Conference on Electronic Information Technology and Computer Engineering (EITCE), Xiamen, China, 2019, pp. 905-908.*

(Continued)

*Primary Examiner* — Pierre Michel Bataille
(74) *Attorney, Agent, or Firm* — Maginot, Moore & Beck, LLP

(57) ABSTRACT

Provided is a many-core definable distributed shared storage structure including: a plurality of routing units, a plurality of processor cores, a plurality of the network interface units, and a plurality of memory modules. Each network interface unit includes a configuration package parsing unit, a data packet assembling/parsing unit, and a routing table. The configuration package parsing unit parses a configuration (Continued)

package acquired from the routing unit by judging an operation type by a packet header: extracting address information and data information in the configuration package; and combining the operation type, the address information and the data information, to obtain and output a routing configuration instruction and a routing control instruction to the routing table. The routing table supports judgment and query, in response to the address signal, of a physical coordinate position of a destination memory module, and provides said physical coordinate position for the data packet assembling/parsing unit.

10 Claims, 1 Drawing Sheet

(56) References Cited

U.S. PATENT DOCUMENTS

| | | | |
|---|---|---|---|
| 2010/0158005 A1* | 6/2010 | Mukhopadhyay | H04L 49/109 370/392 |
| 2011/0029734 A1* | 2/2011 | Pope | H04L 49/90 710/316 |
| 2013/0343387 A1* | 12/2013 | Stroud | H04L 45/74 370/392 |
| 2014/0143520 A1* | 5/2014 | Dobbs | G06F 11/3419 712/30 |
| 2018/0198705 A1* | 7/2018 | Wang | H04L 45/50 |

OTHER PUBLICATIONS

R. Kumar, V. Zyuban and D. M. Tullsen, "Interconnections in multi-core architectures: understanding mechanisms, overheads and scaling," 32nd International Symposium on Computer Architecture (ISCA'05), Madison, WI, USA, 2005, pp. 408-419.*

P. Gratz et al., "On-Chip Interconnection Networks of the TRIPS Chip," in IEEE Micro, vol. 27, No. 5, pp. 41-50, Sep.-Oct. 2007.*

International Search Report corresponding to PCT Application No. PCT/CN2022/091905, mailed Aug. 5, 2022. (Chinese and English language document). (19 pages).

Yang Yong, Structure Study of Storage and Transpose in Heterogeneous Multicore SoC, Information Technology Collection of Full-text Database of Chinese Excellent Master's Dissertations, Hefei University of Technology, Mar. 15, 2014, pp. 6-51, Issue 03.

* cited by examiner

MANY-CORE DEFINABLE DISTRIBUTED SHARED STORAGE STRUCTURE

CROSS-REFERENCE TO RELATED APPLICATION

This application is the U.S. national phase of PCT Application No.PCT/CN2022/091905 filed on May 10, 2022, which claims priority to the Chinese Patent No. CN114297097B with a title "MANY-CORE DEFINABLE DISTRIBUTED SHARED STORAGE STRUCTURE", filed on Dec. 1, 2021, the entire contents of which are incorporated herein by reference.

FIELD

The present disclosure relates to a many-core processor storage structure, particular to an embedded many-core processor storage structure, inside of which is integrated with a plurality of memory modules, wherein the distributed shared storage structure with parallel accesses is provided between the plurality of memory modules.

BACKGROUND

The many-core processor storage system has become an important factor limiting the overall performance improvement of the processor. With the rapid development of the integrated circuit design and manufacturing technology, and with the continuing improvement of the processor functional component performance, the powerful computing capacity brought by integrating a plurality of processor cores within a single chip has been exponentially increasing according to Moore's Law, with a growing rate far greater than that of the storage bandwidth, thus resulting in an increasingly enlarged difference between the computing speed and the memory access speed. Moreover, as the number of processor cores integrated in the multi-core processor increases, there is an increasingly severe "storage wall" bottleneck for the current processor.

In the many-core processor, the storage system performance directly affects the processor performance, thus it is the data storage that is the key to design the many-core processor, rather than the computing capacity any more. At present, the storage system structure mainly includes a shared storage system and a distributed storage system.

The shared storage system, in which the plurality of processor cores access one same memory through an on-chip bus, also known as a symmetric multiple-processor structure, is characterized in that only one main memory, relative to which individual processor cores are completely symmetrical, is provided. That is to say, the time spent by individual processors accessing the main memory is identical, resulting in low cost for internal data synchronization of the storage structure and simple management of the storage unit, while a relative long memory access time due to limitations such as the transmission delay and the memory access bandwidth. This centralized shared storage is currently a popular processor storage structure, with a drawback of poor system's scalability and the limited number of cores (e.g., up to dozens of cores) integrated in the processor.

In the distributed storage system, a plurality of storage units are distributed physically within the plurality of processor cores, respectively (as respective private local memories), which are connected through high bandwidth interconnection. The distributed storage system is less limited by the memory access bandwidth and exhibits favorable system's scalability, the advantages of which lie in enhanced data locality, i.e., those frequently accessed data may be placed in the local memory of the current node, thus reducing both the access-storage delay and the bandwidth requirement for interconnection between the memory and the processor core, while with corresponding disadvantages including the apparent asymmetry for the access-storage operation between different processor cores, the great delay of the access-storage operation across the nodes, the complicated communicating model between different processor cores, increased time consumed for data synchronization, and the needs to consider data distribution in application, thus limiting the development of the distributed storage system.

With reference to the relevant domestic and foreign patents, and the patents related to the many-core processor storage structure are excerpted as follows.

(1) Efficient data transmission support method for many-core multi-level storage system (patent No.: CN112738142B)

The invention discloses an efficient data transmission support method for a many-core multi-level storage system, and the method comprises a typical memory access communication mode performance library and a runtime optimal mode selection module; the typical memory access communication mode performance library is constructed and formed through the following steps: summarizing a typical communication memory access mode in a scientific calculation program; for each typical communication memory access mode, employing a plurality of communication memory access schemes for specific implementation; for each implementation communication memory access scheme, testing the performance under different data scales and the size of a required buffer space, and constructing a typical memory access communication mode library; and the runtime optimal mode selection module searches a typical memory access communication mode library according to the memory access communication mode, the memory access data volume and the available buffer space size information of the user program, and selects an optimal implementation scheme.

(2) Sparse matrix storage method for Sunway many-core architecture (patent application No.: 201910898286.2, withdrawn)

The invention discloses a sparse matrix storage method for an Sunway many-core architecture, a many-core processor is composed of four heterogeneous groups, each heterogeneous group comprises a master core, a slave core cluster composed of 64 slave cores, a heterogeneous group interface and a storage controller, and the whole chip has 260 computing cores; the sparse matrix storage format comprises the following steps: S1, grouping sparse matrixes on a core group array of the Sunway many-core processor according to rows, dividing a plurality of rows from each core into one group, and dividing 64 slave cores into 64 groups; S2, compressing and storing the non-zero elements of the sparse matrix in each group according to columns, compressing column coordinates by saving the number of the non-zero elements contained in each column of the sparse matrix, and finishing storage when column indexes, row coordinates and non-zero element values need to be saved. According to the method, a unified data organization form can be provided for application software to solve the whole process based on the many-core processor, so the adaptability of the problem to the Sunway many-core architecture is improved.

(3) data processing method and system based on a Shenwei heterogeneous many-core processor (patent No.: CN109828790B)

The invention discloses a data processing method and system based on a Shenwei heterogeneous many-core processor and the method comprises the steps: analyzing a user request, and decomposing the user request into a plurality of data processing tasks; classifying the data processing tasks; determining the use conditions of the operation core and the storage medium; and matching the data processing task with the operation core and the storage medium according to the use conditions of the operation core and the storage medium and the classification of the data processing task.

(4) Data storage structure and data access method for multiple core processing system (patent No.: CN104317770B)

The invention mainly aims to solve the problem that according to a multiple core processor, the data storage delay is large, the transmitting efficiency is low, and the multiple core calculating unit array parallel calculating efficiency cannot be improved continuously and provides a data storage structure for the multiple core processing system and a data access method for the data storage structure of the multiple core processor. The accessing and storing costs of the multiple core processing system can be reduced, and the accessing and storing efficiency is improved, and the parallel calculating efficiency of the multiple core processor can be improved. Thus, the present invention provides the data storage structure for the multiple core processing system comprises a global shared memory, a foreign data transmission controller and an internal data transmission controller.

With analysis of the existing patents on the multi-core processor storage structure, it was found that there are only a few of patents focusing on describing the multi-core processor storage system structure. From the literal disclosures, both the shared storage system and the distributed storage system involve a unified addressing mode. The current many-core processor storage structure, especially the on-chip distributed shared storage structure, has the following drawbacks:

(1) At present, after the tape-out production of the many-core processor, the distributed storage structure inside the processor and the off-chip storage structure each have a fixed unified address space, which to a certain extent reduces the processor adaptability for application and the processor performance. On one hand, each memory module within the processor has a fixed corresponding storage space, thus the many-core processor only supports sequential accesses to the memory modules one by one when an application needs to read multiple different data in parallel from this storage system, resulting in the increased data access time and the decreased processor performance. On the other hand, the processor integrates internally numerous processor cores and memory modules, which are divided into multiple groups, each group being responsible for a different task, so that the processor if with a fixed storage structure will greatly adversely affect the compilation and the correct execution of multiple tasks due to interference of the address spatial range.

(2) At present, the many-core processor is of a storage structure impossible to effectively support the ping pong operation in the commonly used digital signal processing algorithm. In the ping pong operation, the data stored in the last execution phase will be read from the storage structure in the next execution phase. The addresses accessed in these two execution phases are the same, which is unachievable for the many-core processor in a unified addressing mode because two memory modules with the same address are not allowed in the processor. Such the ping pong operation can only be implemented in a specialized processing circuit, therefore, the current storage structure adversely affects further improvement of the processor efficiency.

(3) The many-core processor integrates multiple memory modules internally, forming a distributed shared storage system. In the process of data access by the multiple processor cores, if the address space mapping between the processor core and the memory module is not appropriate, such as being far away or experiencing parallel access blocking, it will directly lead to the decreased processor performance and the increased power consumption. Due to limitation by the fixed storage space, researches only focus on scheduling tasks on the processor cores, rather than on-site scheduling and optimization on the distributed shared storage structure. In the practical application, it is often encountered that the task executed on the processor core are divided into multiple stages, and different stages require the reading and writing operation on different memory modules. In view of this, scheduling only the mapping task on the processor core is not enough, and it is necessary to simultaneously analyze the data activity, dependency, and path of multiple memory modules to obtain the optimal storage access mapping correspondence, and define the distributed shared storage system of the processor based on such correspondence.

In summary, the current many-core processor storage system has disadvantages such as a fixed address space, lack of support for the ping pong operation, and inability to flexibly combine memory modules.

SUMMARY

The technical problem solved by the present disclosure is overcoming the drawbacks in the related art, and providing a many-core definable distributed shared storage structure.

The present disclosure provides in embodiments a many-core definable distributed shared storage structure, including:
  an internal data bus system, including a transverse bidirectional data line, a longitudinal bidirectional data line, and a processor core storage access bus;
  a plurality of routing units, each arranged at an intersection of the transverse bidirectional data line and the longitudinal bidirectional data line, and configured to transmit data;
  a plurality of processor cores, each connected to a corresponding routing unit via a corresponding network interface unit;
  a plurality of network interface units, each connected to a corresponding routing unit through a corresponding processor core storage access bus; and
  a plurality of memory modules, each connected to a corresponding routing unit directly,
  wherein the plurality of the memory modules constitute a storage structure system inside a many-core processor.

In some embodiments, each network interface unit includes: a configuration package parsing unit, a data packet assembling/parsing unit, and a routing table,
  wherein the configuration package parsing unit is configured to parse a configuration package acquired from the routing unit, wherein the configuration package is parsed by: judging an operation type by a packet header; extracting address information and data information in the configuration package; and combining the operation type, the address information and the data information, to obtain and output a routing configuration instruction and a routing control instruction to the routing table, wherein the routing configuration instruction includes the address information, the data information and a first writing signal;

the routing control instruction includes memory module grouping flag information, memory module ping pong reading and writing control information, and a second writing signal, wherein the data packet assembling/parsing unit is responsible for data format conversion between the processor core and the corresponding routing unit connected thereto, to obtain a valid data by parsing a data packet acquired from the corresponding routing unit; and wherein the data packet assembling/parsing unit is configured to convert (1) and (2) to a network-on-chip transmittable data packet: (1) a reading and writing data output from the processor core; and (2) a physical coordinate position of a destination memory module acquired from the routing table, and output the network-on-chip transmittable data packet to the corresponding routing unit, wherein the packet header of the data packet includes the physical coordinate position of the destination memory module acquired from the routing table, wherein the routing table is configured to support judgment and query, in response to an address signal output from the processor core, of a physical coordinate position of a destination memory module corresponding to said address signal, and provide said physical coordinate position for the data packet assembling/parsing unit;

wherein all fields in the routing table are written or changed in line with the routing configuration instruction; and wherein a routing control field in the routing table is written or changed in line with the routing control instruction.

In some embodiments, the routing table includes:

a plurality of routing lookup rows, each routing lookup row includes the routing control field, a routing arbitration field, and a routing destination field, wherein the routing control field, the routing arbitration field, and the routing destination field in the routing lookup row are set based on the routing configuration instruction;

an address arbitration unit, configured to for the $n^{th}$ routing lookup row with the routing control field having a valid bit of '1', wherein n=1, 2, 3, . . . , N, wherein N represents the total number of the routing lookup rows with the routing control field having the valid bit of '1':

subject the address signal output from the processor core and a valid address flag bit of the routing arbitration field of the $n^{th}$ routing lookup row to a bitwise logical operation;

compare an operational result with a valid address value bit of the routing arbitration field;

set an address matching flag signal of the $n^{th}$ routing lookup row as '1' in response to consistent comparison; and set the address matching flag signal of the $n^{th}$ routing lookup row as '0' in response to inconsistent comparison;

a priority judgment unit, configured to in the case that the address matching flag signal of the $n^{th}$ routing lookup row is '1':

output a priority flag signal of '10' for the n'h routing lookup row, in response to a reading signal output from the processor core and a ping pong reading flag bit both being '1';

output the priority flag signal of '10' for the $n^{th}$ routing lookup row, in response to a writing signal output from the processor core and a ping pong writing flag bit both being '1'; or otherwise, output the priority flag signal of '01' for the $n^{th}$ routing lookup row;

in the case that the address matching flag signal of the $n^{th}$ routing lookup row is '0':

output the priority flag signal of '00' for the n'h routing lookup row, wherein the priority flag signal is a 2-bit signal line, where a high bit setting as '1' indicates that the routing destination field of the corresponding routing lookup row is at high priority; a low bit setting as '1' indicates that the routing destination field of the corresponding routing lookup row is at low priority; and an address group matching unit, serving as a combinatory logic unit, configured to compare whether an address group flag bit in the routing control field of each routing lookup row is consistent with a data bit representing an address group in the routing control instruction; and extract routing control field modifying information from the routing control instruction, and output the same to the corresponding routing lookup row, in response to consistent comparison.

In some embodiments, the routing control field includes the valid bit, the address group flag bit, the ping pong reading flag bit, the ping pong writing flag bit, and an ordinary operation flag bit;

in accordance with the routing configuration instruction, the address group flag bits of the routing lookup rows belonging to one same group are set to have a same value;

with a routing table control instruction, these routing lookup rows all are set to be valid or invalid, and modified for the ping pong reading flag bit and the ping pong writing flag bit both; and the routing arbitration field includes the valid address flag bit and the valid address value bit;

in the case that a certain bit in the valid address flag bit is set as '1', a value of the valid address value bit at the position corresponding to said certain bit is valid, when the address signal output from the processor core is of an address value at said certain bit being consistent with the value of the valid address value bit, a matched address is indicated, and the address signal output from the processor core is in the current routing lookup row, otherwise, when the address signal output from the processor core is of an address value at said certain bit being inconsistent with the value of the valid address value bit, an unmatched address is indicated, and the address signal output from the processor core is not in the current routing lookup row;

the routing destination field stores the physical coordinate position of the memory module.

In some embodiments, in the routing control field, the valid bit indicates whether the current routing lookup row is valid;

the address group flag bit is configured to unify the memory modules defined by several routing lookup rows into a group of address definition system, for centralized control;

the ping pong reading flag bit and the ping pong writing flag bit are configured to distinguish the physical coordinate position of the destination memory module in the case of a reading access and the physical coordinate position of the destination memory module in the case of a writing access.

In some embodiments, the valid address flag bit is of a first bit width consistent with a second bit width of the valid address value bit, for the routing arbitration field.

In some embodiments, the valid address flag bit of the routing arbitration field is of the first bit width of 16-bit, 32-bit, or 64-bit; and the valid address value bit of the routing arbitration field is of the second bit width of 16-bit, 32-bit, or 64-bit.

In some embodiments, the valid address value bit is of the second bit width consistent with a third bit width of the address signal output from the processor core.

In some embodiments, information acquired from the routing table and provided for the data packet assembling/parsing unit further includes the priority flag signal, wherein in the routing table, the routing destination field in the routing lookup row with the priority flag signal '01' is set as the low bit, while the routing destination field in the routing lookup row with the priority flag signal '10' is set as the high bit; and a destination physical coordinate combination signal is formed and provided for the data packet assembling/parsing unit.

In some embodiments, the physical coordinate position stored in the routing destination field is a two-dimensional rectangular coordinate value, in response to the many-core processor being of a two-dimensional topology structure; and the physical coordinate position stored in the routing destination field is a three-dimensional rectangular coordinate value, in response to the many-core processor being of a three-dimensional topology structure.

In some embodiments, each routing table includes a plurality of routing lookup rows definable by a software, and correspondence is established between a processor core access storage address and the destination memory module through the plurality of routing lookup rows, forming the many-core definable distributed shared storage structure.

As compared with the related art, the present disclosure has the advantages as below.

(1) In the traditional processor, the on-chip storage system is fixed, with the fixed storage address, the fixed number of BANKs, and the fixed accessible processor core. According to embodiments of the present disclosure, the routing table, defined by the network interface unit and distributed among multiple memory modules within the many-core processor, is not only capable of adding up the storage capacities of all memory modules and mapping them into a unified shared storage space, which is accessed by each processor core within the many-core processor; but also possible to combine several memory modules into one group that are accessed by a particular processor core and become its private memory.

(2) In the many-core processor, the processor core distinguishes the reading access destination address and the writing access destination address through the routing table defined by the network interface unit. That is, the memory modules for ultimate data reading and data writing may be different for one same access address output from the processor core, due to different reading and writing operations, such that it is achievable to read, calculate and write at the same time, without the need for data to be read from and written into the memory in a time-sharing manner, thereby improving the many-core processor performance.

(3) In the many-core processor, the definable routing table in the network interface unit enables the storage system of the processor to have the following advantages:

When concurrently processing multiple data paths, use of the definable routing table allows for addressing different memory modules in accordance with several different bits in the corresponding address signal line, thus achieving parallel access to multiple memory modules, and improving the on-chip storage access bandwidth and data throughput;

In addition to the routing table configuration instruction, the routing table control instruction for "the routing table control field" operation is introduced such that it is achievable to set a group of storage address definitions (composed of multiple routing lookup rows) rather than individual routing lookup rows one by one. For example, it is possible to change "ping pong reading flag" and "ping pong writing flag" for a group of storage address definitions by controlling the bus through the routing table, thereby achieving the exchange of the mapping correspondence between the reading and writing addresses for multiple memory modules in the ping pong operation for data processing in an easy and simple way, thus shortening the redefinition (reconfiguration) time, and improving the control efficiency;

The definable routing table is defined through the configuration instruction and is not coupled in any way with either the address signal or the reading/writing signal output from the processor core when executing the reading/writing access operation. The routing table not only achieves current access of the normal arbitration destination coordinate, but is also capable of defining another set of the storage system through the configuration instruction.

DETAILED DESCRIPTION

Figure 1:
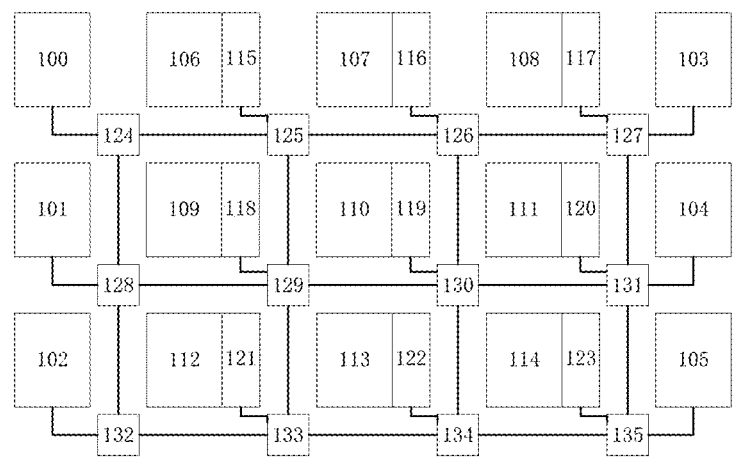
FIG. 1 is a schematic diagram showing an overall structure of a many-core processor in embodiments of the present disclosure.

The present disclosure will be further explained below in combination with embodiments.

The present disclosure aims to design a many-core processor storage structure suitable for an embedded application, thus allowing such storage structure to achieve the following objects.

(1) For the many-core storage system provided in embodiments of the present disclosure, the processor integrates the storage system internally, so that the addressing space is not fixed any more, instead, is an on-site definable storage system by the routing table, thus improving the effectiveness of the storage system definitions within the many-core processor. The storage system inside the conventional many-core processor includes multiple memory modules, explicitly specifying individual fixed storage addresses, the fixed number of BANKs, and the fixed accessible processor cores. This fixation reduces the flexibility of the structure to adapt to the algorithm.

For the regular digital signal processing algorithm like fast Fourier transform (FFT), in order to minimize the processing time, it is necessary to simultaneously read multiple data from different addresses per clock cycle, under the circumstance of which, if the storage system definition is unreasonable or lacks flexibility, an access conflict will occur, resulting in reduced data read per clock cycle, ultimately leading to degraded performance of the algorithm when executed by the many-core processor.

For example, the many-core processor integrates four memory modules each with a capacity of 0x100 bytes, where the memory module 1 is of a first address range of 0x0~0x0ff, the memory module 2 is of a second address range of 0x100~0x1ff, the memory module 3 is of a third address range of 0x200~0x2ff, and the memory module 4 is of a fourth address range of 0x300~0x3ff, defined by the internal storage system of the conventional many-core processor. Such a storage system, when processing the FFT butterfly operation and assuming that the fetch addresses are 0,1,2,3, and so on, the access conflict occurs due to all of the four addresses falling into the first address range of the memory module 1, and thus only one access is achievable for a single clock cycle.

In embodiments of the present disclosure, the many-core processor integrates a plurality of memory modules, each of which is of a certain capacity and belongs to none of the processor cores at the initial operation of the many-core processor. In embodiments of the present disclosure, the definable routing table is provided in the network interface unit corresponding to each processor core, specifying, for a current processor core, the coordinate information of the memory module corresponding to the reading access destination address and the writing access destination address, thus achieving the object of the definable storage system of the many-core processor, and enabling better cooperation between the storage system and the algorithm application.

In an embodiment of the present disclosure, the definable routing table can define data according to addresses 0,4,8; 1,5,9; 2,6,10; 3,7,11, . . . stored in four different memory modules. When processing the FFT butterfly operation, although the fetch address is still 0,1,2,3, four parallel accesses are achievable for a single clock cycle, because these four addresses are located in different memory modules respectively.

The storage structure is designed to serve for the processor cores in reading and writing data, and each processor core is provided with such a definable routing table, thus enabling flexible combination and allocation of the entire storage system for the many-core processor.

(2) According to embodiments of the present disclosure, the many-core storage system is provided with the definable routing table, thus enabling redefinition during the operation of the processor core, rather than with an unchangeable routing table in the many-core processor. In the many-core processor, the routing table is provided with dedicated configuration and control instructions, which are mainly responsible for writing and changing the routing table control information in the routing table, which instructions are different from the data, address, and control signal output from the corresponding processor core.

(3) According to embodiments of the present disclosure, the many-core storage system is provided with a definable routing table, which includes a plurality of "routing lookup rows", each including the routing table control field, the routing table arbitration field, and the routing table destination field. The routing table control field is configured to support control of the validity of the current routing lookup row, and whether the ping pong operation is supported. The routing table arbitration field is configured to support determination on whether the access address is within the storage space defined in the current lookup row. The routing table destination field is configured to support storage of the destination coordinate address of the storage space corresponding to the current lookup row.

(4) According to embodiments of the present disclosure, the many-core storage system is provided with a definable routing table, in which the "ping pong reading flag" and the "ping pong writing flag" are defined, such that respective two sets of the storage systems supporting reading and writing are achievable for one same address, thus supporting the common ping pong operation in the data processing algorithm well.

The "ping pong reading flag" being valid indicates that the processor core is executing the ping pong operation, during which the subsequent address arbitration information and coordinate information are valid only when the processor core is executing the reading access operation; while the "ping pong writing flag" being valid indicates that the processor core is executing the ping pong operation, during which the subsequent address arbitration information and coordinate information are valid only when the processor core is executing the writing access operation.

According to embodiments of the present disclosure, the definable routing table enables respective two sets of the storage systems for the reading access operation and the writing access operation, with each set of the storage system includes several memory modules. That is, the memory modules for ultimate data reading and data writing may be different for one same access address output from the processor core, due to different reading and writing operations.

Upon exchange of the ping pong operation, it is only necessary to change the "ping pong reading flag" and the "ping pong writing flag" in the routing table, i.e., changing the valid "ping pong reading flag" to the valid "ping pong writing flag" in the routing table, or changing the valid "ping pong writing flag" to the valid "ping pong reading flag" in the routing table, thereby achieving the address exchange of the storage spaces corresponding to ping pong operation.

(5) According to embodiments of the present disclosure, the many-core processor storage system is provided with the definable routing table, in which the "valid address flag bit" and "valid address value bit" containing field allows to distinguish different address space ranges for individual memory modules.

As to the storage access address, firstly the data bit in the "valid address flag bit" containing field is subjected to the "AND" bitwise logic operation; then the operational result is compared to the "valid address value bit" containing field; and in response to consistent comparison, it is indicated that the destination coordination corresponding to the storage access address is just the destination coordination in the "routing table destination field" corresponding to the current routing lookup row.

The "valid address flag bit" and "valid address value bit" containing field in the routing table enables to achieve grouping the storage spaces of the different memory modules in accordance to the address high bit, the address low bit, and several certain address intermediate bits, thus ensuring flexibility of the storage space.

In specific, the present disclosure provides in embodiments a many-core definable distributed shared storage structure. In the designation, the following main embodiments are given below.

(1) In an embodiment, the many-core processor integrates a plurality of processor cores and a plurality of memory modules, constructing a two-dimensional grid architecture, where each processor core corresponds to one routing unit, the processor core may be either a microprocessor or an acceleration engine of a Digital System Processor (DSP) that performs a specific function. Each processor core corresponds to one network interface unit for achieving format conversion of the data packet transmitted between the processor core and the routing unit. The network interface unit internally integrates a routing table, which directly queries the destination coordination according to the address output from the processor core. The data packet, added with the destination coordination to the packet header, is enabled to arrive to the memory module to be accessed through the routing unit under the guidance of the destination coordinate.

(2) In an embodiment, the many-core processor integrates a plurality of processor cores and a plurality of memory modules, constructing a three-dimensional grid architecture, where each processor core corresponds to one routing unit, the processor core may be either a microprocessor or an acceleration engine of a Digital System Processor (DSP) that performs a specific function. Each processor core corresponds to one network interface unit for achieving format conversion of the data packet transmitted between the processor core and the routing unit. The network interface unit internally integrates a routing table, which directly supports query of the destination coordination according to the address output from the processor core. The data packet, added with the destination coordination to the packet header, is enabled to arrive to the memory module to be accessed through the routing unit under the guidance of the destination coordinate.

(3) In an embodiment, the many-core processor integrates a plurality of processor cores and a plurality of memory modules, constructing a two-dimensional grid architecture, where each processor core corresponds to one routing unit, the processor core may be either a microprocessor or an acceleration engine of a Digital System Processor (DSP) that performs a specific function. Each processor core corresponds to one network interface unit for achieving format conversion of the data packet transmitted between the processor core and the routing unit. The routing unit integrates a routing table, and supports query of the destination coordination from the routing table according to the destination address information of the data packet for those data packets with unspecified destination coordination. The data packet, added with the destination coordination to the packet header, is enabled to arrive to the memory module to be accessed through the routing unit under the guidance of the destination coordinate.

(4) In an embodiment, the many-core processor integrates a plurality of processor cores and a plurality of memory modules, constructing a three-dimensional grid architecture, where each processor core corresponds to one routing unit, the processor core may be either a microprocessor or an acceleration engine of a Digital System Processor (DSP) that performs a specific function. Each processor core corresponds to one network interface unit for achieving format conversion of the data packet transmitted between the processor core and the routing unit. The routing unit integrates a routing table, and supports query of the destination coordination from the routing table according to the destination address information of the data packet for those data packets with unspecified destination coordination. The data packet, added with the destination coordination to the packet header, is enabled to arrive to the memory module to be accessed through the routing unit under the guidance of the destination coordinate.

(5) In an embodiment, the many-core processor integrates a plurality of definable routing tables, establishing correspondence between the processor core access storage addresses and the destination memory modules. As the routing table includes a plurality of routing lookup rows, the correspondence between the plurality of the memory modules and the access addresses is established, thus forming the many-core distributed shared storage structure.

(6) In an embodiment, the routing lookup row includes the routing control field, the routing arbitration field, and the routing destination field. The routing control field includes the valid bit of the routing lookup row, the address group flag bit, the ping pong reading flag bit, and the ping pong writing flag bit. The valid bit of the routing lookup row indicates whether the current routing lookup row is valid. The address group flag bit is configured to unify the memory modules defined by several routing lookup rows into one group of address definition system, for convenience of the centralized control, i.e., controlling a group of multiple routing lookup rows in a unified way, instead of individual controlling multiple routing lookup rows one by one. The ping pong reading flag bit and the ping pong writing flag bit are configured to distinguish the destination coordinate of the memory module for the reading access and the destination coordinate of the memory module for the writing access, which are output from one same address though, allowing for respective ultimate destination memory modules depending on different reading access and writing access, for convenience of achieving constant exchange between the storage spaces for writing and reading in the ping pong operation with such a designation. The routing arbitration field is responsible for address matching. In the case that the address information output from the processor core is matched with the routing arbitration field, i.e., consistent match, it is indicated that the coordinate data of the destination field in the current routing lookup row can be taken as the destination coordinate. The valid address flag bit in the routing arbitration field defines which bit in the address data must be compared; while the valid address value bit in the routing arbitration field defines whether the data corresponding to the flag bit in the address data that must be compared should be '1' or '0'.

According to embodiments of the present disclosure, the MESH (two-dimensional grid) architecture-based many-core processor is provided with the internal data bus system, which includes the transverse bidirectional data line, the longitudinal bidirectional data line, and the processor core storage access bus; the routing unit is arranged at the intersection of the transverse bidirectional data line and the longitudinal bidirectional data line, that is, the bidirectional data line is provided between any two adjacent routing units for transmitting data. The processor core is connected to the routing unit indirectly through the network interface unit, and the routing unit is connected to the network interface unit via the processor core storage access bus. The memory module is connected to the routing unit directly, and the plurality of the memory modules constitute the storage structure system inside the many-core processor.

EXAMPLES

FIG. 1 is a schematic diagram showing an overall structure of a many-core processor in embodiments of the present disclosure.

In FIG. 1, there is provided 6 memory modules with the respective reference signs of 100 to 105; 9 processor cores with the respective reference signs of 106 to 114; 9 network interface units with the respective reference signs of 115 to 123; and 12 routing units with the respective reference signs of 124 to 135.

The memory module with the reference sign 100 is connected to the routing unit with the reference sign 124 through the bidirectional data line.

The memory module with the reference sign 101 is connected to the routing unit with the reference sign 128 through the bidirectional data line.

The memory module with the reference sign 102 is connected to the routing unit with the reference sign 132 through the bidirectional data line.

The memory module with the reference sign 103 is connected to the routing unit with the reference sign 127 through the bidirectional data line.

The memory module with the reference sign 104 is connected to the routing unit with the reference sign 131 through the bidirectional data line.

The memory module with the reference sign 105 is connected to the routing unit with the reference sign 135 through the bidirectional data line.

The processor core with the reference sign 106 is connected to the network interface unit with the reference sign 115 through the processor core address bus, the data bus, and the reading/writing signal.

The processor core with the reference sign 107 is connected to the network interface unit with the reference sign 116 through the processor core address bus, the data bus, and the reading/writing signal.

The processor core with the reference sign 108 is connected to the network interface unit with the reference sign 117 through the processor core address bus, the data bus, and the reading/writing signal.

The processor core with the reference sign 109 is connected to the network interface unit with the reference sign 118 through the processor core address bus, the data bus, and the reading/writing signal.

The processor core with the reference sign 110 is connected to the network interface unit with the reference sign 119 through the processor core address bus, the data bus, and the reading/writing signal.

The processor core with the reference sign 111 is connected to the network interface unit with the reference sign 120 through the processor core address bus, the data bus, and the reading/writing signal.

The processor core with the reference sign 112 is connected to the network interface unit with the reference sign 121 through the processor core address bus, the data bus, and the reading/writing signal.

The processor core with the reference sign 113 is connected to the network interface unit with the reference sign 122 through the processor core address bus, the data bus, and the reading/writing signal.

The processor core with the reference sign 114 is connected to the network interface unit with the reference sign 123 through the processor core address bus, the data bus, and the reading/writing signal.

The network interface unit with the reference sign 115 is connected to the routing unit with the reference sign 125 through the bidirectional data line.

The network interface unit with the reference sign 116 is connected to the routing unit with the reference sign 126 through the bidirectional data line.

The network interface unit with the reference sign 117 is connected to the routing unit with the reference sign 127 through the bidirectional data line.

The network interface unit with the reference sign 118 is connected to the routing unit with the reference sign 129 through the bidirectional data line.

The network interface unit with the reference sign 119 is connected to the routing unit with the reference sign 130 through the bidirectional data line.

The network interface unit with the reference sign 120 is connected to the routing unit with the reference sign 131 through the bidirectional data line.

The network interface unit with the reference sign 121 is connected to the routing unit with the reference sign 133 through the bidirectional data line.

The network interface unit with the reference sign 122 is connected to the routing unit with the reference sign 134 through the bidirectional data line.

The network interface unit with the reference sign 123 is connected to the routing unit with the reference sign 135 through the bidirectional data line.

The routing unit with the reference sign 124 is connected to the routing units with respective reference signs 125, 128 and the memory module with the reference sign 100, respectively, through the bidirectional data line.

The routing unit with the reference sign 125 is connected to the routing units with respective reference signs 124, 126, 129 and the network interface unit with the reference sign 115, respectively, through the bidirectional data line.

The routing unit with the reference sign 126 is connected to the routing units with respective reference signs 125, 127, 130 and the network interface unit with the reference sign 116, respectively, through the bidirectional data line.

The routing unit with the reference sign 127 is connected to the routing units with respective reference signs 126, 131, the network interface unit with the reference sign 117, and the memory module with the reference sign 103, respectively, through the bidirectional data line.

The routing unit with the reference sign 128 is connected to the routing units with respective reference signs 124, 129, 132 and the memory module with the reference sign 101, respectively, through the bidirectional data line.

The routing unit with the reference sign 129 is connected to the routing units with respective reference signs 125, 128, 130, 133 and the network interface unit with the reference sign 118, respectively, through the bidirectional data line.

The routing unit with the reference sign 130 is connected to the routing units with respective reference signs 126, 129, 131, 134 and the network interface unit with the reference sign 119, respectively, through the bidirectional data line.

The routing unit with the reference sign 131 is connected to the routing units with respective reference signs 127, 130, 135, the network interface unit with the reference sign 120, and the memory module with the reference sign 104, respectively, through the bidirectional data line.

The routing unit with the reference sign 132 is connected to the routing units with respective reference signs 128, 133 and the memory module with the reference sign 102, respectively, through the bidirectional data line.

The routing unit with the reference sign 133 is connected to the routing units with respective reference signs 129, 132, 134 and the network interface unit with the reference sign 121, respectively, through the bidirectional data line.

The routing unit with the reference sign 134 is connected to the routing units with respective reference signs 130, 133, 135 and the network interface unit with the reference sign 122, respectively, through the bidirectional data line.

The routing unit with the reference sign 135 is connected to the routing units with the reference signs 131, 134, the network interface unit with the reference sign 123, and the memory module with the reference sign 105, respectively, through the bidirectional data line.

The 9 processor cores with the respective reference signs 106 to 114 each includes a control logic unit, responsible for decoding an instruction executed by the processor core and outputting a control signal to complete individual operations to be executed by each instruction; a storage unit, serving as a space for temporal data storage, internally storing either data to be processed or data has been process; and an operational logic unit, executing an arithmetic operation (including a basic operation such as addition, subtraction, multiplication, and division, as well as an additional operation) and a logical operation.

The 12 routing units with the respective reference signs 124 to 135 each has five-directional bidirectional data interfaces in total, i.e., an east-direction bidirectional data interface, a west-direction bidirectional data interface, a south-direction bidirectional data interface, a north-direction bidirectional data interface and a local bidirectional data interface, and each-direction bidirectional data interface is provided with an input buffer zone; an input control logic; and an output arbitration logic by its own. The input buffer zone is to cache the data packet that arrives at the router, usually using a First-In-First-Out (FIFO) strategy, which plays a certain flow control role. The output arbitration logic is to arrange the output of requests from multiple requesters according to a certain rule or an established rule when the multiple requesters request one same shared resource.

The 6 memory modules with the respective reference signs 100 to 105 each are a memory component used to store a program and various data information, which may be the Random Access Memory (RAM), the Read Only Memory (ROM), the Dynamic Random Access Memory (DRAM), the Non-Volatile Memory (NVM).

Figure 2:
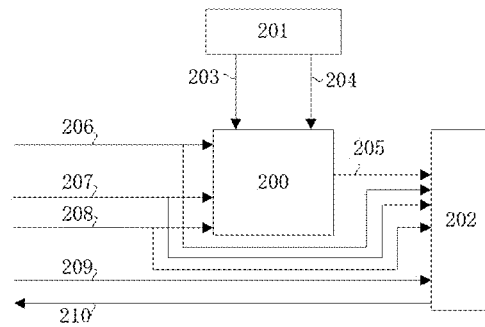
FIG. 2 is a structural diagram showing a network interface unit in embodiments of the present disclosure.

FIG. 2 is a structural diagram showing a network interface unit in embodiments of the present disclosure.

The structural diagram of the network interface unit, as shown in FIG. 2, illustrates a mechanism establishing communication between the processor core and the routing unit. The network interface unit is connected to the processor core at one end, and connected to the routing unit at another end. In FIG. 2, the network interface unit includes a routing table 200, a configuration package parsing unit 201, and a data packet assembling/parsing unit 202.

The routing table with the reference sign 200 is configured to be input with the routing table control instruction with the reference sign 203, the routing table configuration instruction with the reference sign 204, the address signal with the reference sign 206 output from the processor core, the reading signal with the reference sign 207 output from the processor core, the writing signal with the reference sign 208 output from the processor core; and the routing table with the reference sign 200 is configured to provide the destination physical coordinate combination signal with the reference sign 205. The routing table with the reference sign 200 is connected to the configuration package parsing unit with the reference sign 201 via the routing table control instruction with the reference sign 203 and the routing table configuration instruction with the reference sign 204; and the routing table with the reference sign 200 is connected to the data packet assembling/parsing unit with the reference sign 202 via the destination physical coordinate combination signal with the reference sign 205.

The configuration package parsing unit with the reference sign 201 is configured to output the routing table control instruction with the reference sign 203 and the routing table configuration instruction with the reference sign 204. The configuration package parsing unit with the reference sign 201 is connected to the routing table with the reference sign 200 via the routing table control instruction with the reference sign 203 and the routing table configuration instruction with the reference sign 204.

The data packet assembling/parsing unit with the reference sign 202 is configured to be input with the address signal with the reference sign 206 output from the processor core, the reading signal with the reference sign 207 output from the processor core, the writing signal with the reference sign 208 output from the processor core, the data signal with the reference sign 209 output from the processor core, and the destination physical coordinate combination signal with the reference sign 205; and the data packet assembling/parsing unit with the reference sign 202 is configured to output the data signal with the reference sign 210 to the processor core. The data packet assembling/parsing unit with the reference sign 202 is connected to the routing table with the reference sign 200 via the destination physical coordinate combination signal with the reference sign 205.

The configuration package parsing unit with the reference sign 201 is a time-sequential logic unit responsible for parsing the configuration package acquired from the routing unit. The term "parsing" used here refers to judging an operation type by a packet header, extracting address information and data information in the configuration package, and combining the operation type, the address information and the data information parsed from the configuration package to obtain a routing configuration instruction and a routing control instruction by combination. The routing configuration instruction includes the address information, the data information and a first writing signal, for writing and changing all fields in the routing table. The routing control instruction includes memory module grouping flag information, memory module ping pong reading and writing control information, and a second writing signal, for writing and changing the routing control field in the routing table.

The data packet assembling/parsing unit with the reference sign 202 is a time-sequential logic unit responsible for data format conversion between the processor core and the routing unit. The "parsing" used here refers to parsing the input data packet received to obtain the valid data. The "assembling" used here refers to a process of forming the output data packet, i.e., converting (1) and (2) to the network-on-chip transmittable data packet: (1) the reading and writing data output from the processor core and (2) the physical coordinate position of the destination memory module, wherein the physical coordinate position of the destination memory module acquired from the routing table is taken as the packet header of the data packet, the data packet is output to the corresponding routing unit in accordance with the physical coordinate position of the destination memory module.

Figure 3:
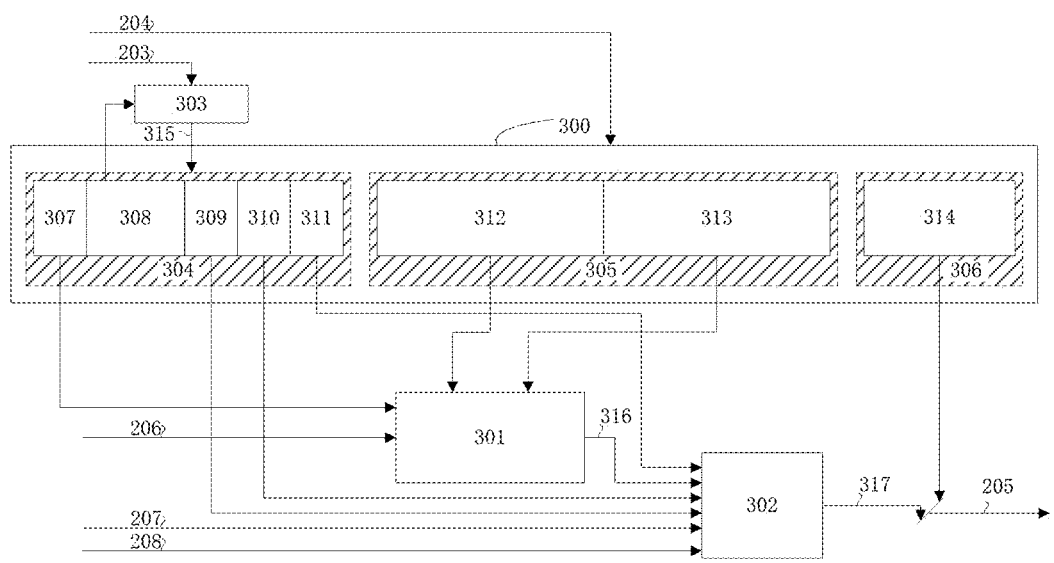
FIG. 3 is a structural diagram showing a routing table in embodiments of the present disclosure.

FIG. 3 is a structural diagram showing a routing table in embodiments of the present disclosure.

The structural diagram as shown in Table 3 illustrates the routing table which is responsible for support of judgment and query, in response to the address signal output from the processor core, of the physical coordinate position of the destination memory module corresponding to the current address signal; and provision of said physical coordinate position, so that the position coordination information is written in the packet header during the data packet assembly by the data packet assembling/parsing unit with the reference sign 202.

In FIG. 3, the routing table includes a plurality of routing lookup rows each with the reference sign 300, the address arbitration unit with the reference sign 301, the priority judgment unit with the reference sign 302, and the address group matching unit with the reference sign 303.

The routing lookup row with the reference sign 300 includes the routing control field with the reference sign 304, the routing arbitration field with the reference sign 305, and the routing destination field with the reference sign 306. The routing table configuration instruction with the reference sign 204 is the input signal for the routing lookup row, the routing control field, the routing arbitration field, and the routing destination field in the routing lookup row are set based on the routing table configuration instruction with the reference sign 204.

The routing control field with the reference sign 304 includes the valid bit with the reference sign 307, the address group flag bit with the reference sign 308, the ping pong reading flag bit with the reference sign 309, the ping pong writing flag bit with the reference sign 310, and the ordinary operation flag bit with the reference sign 311. The address group flag bit with the reference sign 308 is mainly for the convenience of the unified control over routing lookup rows belonging to one same group, where the address group flag bits in the respective routing lookup rows can be set to have the same value, such that these routing lookup rows all are set to be valid or invalid, and modified for the ping pong reading flag bit and the ping pong writing flag bit both via through the routing table control bus.

The routing arbitration field with the reference sign 305 includes the valid address flag bit with the reference sign 312 and the valid address value bit with the reference sign 313. The valid address flag bit with the reference sign 312 may be of the first bit width of 16-bit, 32-bit or 64-bit. The valid address value bit with the reference sign 313 may be of the second bit width of 16-bit, 32-bit or 64-bit. The first bit width for the valid address flag bit with the reference sign 312 and the second bit width for the valid address value bit with the reference sign 313 are controlled to be consistent with the third bit width of the address signal output from the processor core. In the case that a certain bit in the valid address flag bit with the reference sign 312 is set as '1', the value of the valid address value bit with the reference sign 313 at the position corresponding to said certain bit is valid, when the address signal with the reference sign 206 output from the processor core is of the address value at said certain bit being consistent with the value of the valid address value bit with the reference sign 313, a matched address is indicated, and the address signal output from the processor core is in the current routing lookup row; otherwise when the address signal output from the processor core is of the address value at said certain bit being inconsistent with the value of the valid address value bit, an unmatched address is indicated, and the address signal output from the processor core is not in the current routing lookup row.

The routing destination field with the reference sign 306 stores the physical coordinate position with the reference sign 314. The physical coordinate position is the two-dimensional rectangular coordinate value in response to the many-core processor being of a two-dimensional topology structure; while the physical coordinate position is the three-dimensional rectangular coordinate value, in response to the many-core processor being of a three-dimensional topology structure.

The address arbitration unit with the reference sign 301 is configured to be input with the valid bit with the reference sign 307 of the routing lookup row, the address signal with the reference sign 206 output from the processor core, the valid address flag bit with the reference sign 312 and the valid address value bit with the reference sign 313; and to provide the address matching flag signal with the reference sign 316. The address arbitration unit is a combinatory logic unit with the function as below: in the case that the valid bit of the routing lookup row is set to be '1', subjecting the address signal output from the processor core and the valid address flag bit to the bitwise logical operation; comparing the operational result with the valid address value bit; setting the output address matching flag signal as '1' in response to consistent comparison; and setting the output address matching flag signal as '0' in response to inconsistent comparison.

The priority judgment unit with the reference sign 302 is configured to be input with the reading signal with the reference sign 207 output from the processor core, the writing signal with the reference sign 208 output from the processor core, the ping pong reading flag bit with the reference sign 309, the ping pong writing flag bit with the reference sign 310, and the address matching flag signal with the reference sign 316 output from the address arbitration unit 301; and to output the priority flag signal with the reference sign 317. The priority flag signal with the reference sign 317 is a 2-bit signal line, wherein a high bit setting as '1' indicates that the coordinate position queried by the current routing lookup row is at high priority; a low bit setting as '1' indicates that the coordinate position queried by the current routing lookup row is at low priority. The priority judgment unit with the reference sign 302 is a combinatory logic unit with the function as below: in the case that the address matching flag signal with the reference sign 316 is set as '1', in response to the reading signal with the reference sign 207 and the ping pong reading flag bit with the reference sign 309 both setting as '1', setting the priority flag signal with the reference sign 317 as '10', indicating the high priority; in response to the writing signal with the reference sign 208 and the ping pong writing flag bit with the reference sign 310 both setting as '1', setting the priority flag signal with the reference sign 317 as '10', indicating the high priority; otherwise, setting the priority flag signal with the reference sign 317 as '01', indicating the low priority; in the case that the address matching flag signal with the reference sign 316 is set as is '0', the priority flag signal with the reference sign 317 is set as '00'.

The address group matching unit with the reference sign 303 is configured to be input with the routing table control instruction with the reference sign 203 and the address group flag bit with the reference sign 308; and to provide the routing table address group control signal with the reference sign 315. The address group matching unit with the reference sign 303 is a combinatory logic unit with the function as below: comparing whether the address group flag bit with the reference sign 308 is consistent with a data bit representing an address group in the routing table control instruction with the reference sign 203; in response to consistent comparison, extracting routing control field modifying information from the routing table control instruction with the reference sign 203; and forming the routing table address group control signal with the reference sign 315 for outputting, which is connected to the routing control field with the reference sign 304.

The priority flag signal with the reference sign 317 and the physical coordinate value bit with the reference sign 314 are combined together to form the destination physical coordinate combination signal with the reference sign 205 for outputting, where the priority flag signal is at the high bit of the physical coordinate combination signal. During the data packet assembly by the data packet assembling/parsing unit, the physical coordinate value bit corresponding to the high priority flag signal is selected for the physical coordinate information in the packet header.

The content not described in detail in the specification of the present disclosure belongs to the common knowledge of professionals in the art.

What is claimed is:

1. A many-core definable distributed shared storage structure, comprising:
    an internal data bus system, comprising a transverse bidirectional data line, a longitudinal bidirectional data line, and a processor core storage access bus;
    a plurality of routing units, each arranged at an intersection of the transverse bidirectional data line and the longitudinal bidirectional data line, and configured to transmit data;
    a plurality of processor cores, each connected to a corresponding routing unit via a corresponding network interface unit;
    a plurality of network interface units, each connected to a corresponding routing unit through a corresponding processor core storage access bus; and
    a plurality of memory modules, each connected to a corresponding routing unit directly,
    wherein the plurality of the memory modules constitute a storage structure system inside a many-core processor,
    wherein each network interface unit comprises: a configuration package parsing unit, a data packet assembling/parsing unit, and a routing table,
    wherein the configuration package parsing unit is configured to parse a configuration package acquired from the routing unit, wherein the configuration package is parsed by: judging an operation type by a packet header; extracting address information and data information in the configuration package; and combining the operation type, the address information and the data information, to obtain and output a routing configuration instruction and a routing control instruction to the routing table, wherein
        the routing configuration instruction comprises the address information, the data information and a first writing signal;
        the routing control instruction comprises memory module grouping flag information, memory module ping pong reading and writing control information, and a second writing signal,
    wherein the data packet assembling/parsing unit is responsible for data format conversion between the processor core and the corresponding routing unit connected thereto, to obtain a valid data by parsing a data packet acquired from the corresponding routing unit; and
    wherein the data packet assembling/parsing unit is configured to
        convert (1) and (2) to a network-on-chip transmittable data packet: (1) a reading and writing data output from the processor cores; and (2) a physical coordinate position of a destination memory module acquired from the routing table, and
        output the network-on-chip transmittable data packet to the corresponding routing unit,
    wherein the packet header of the data packet comprises the physical coordinate position of the destination memory module acquired from the routing table,
    wherein the routing table is configured to support judgment and query, in response to the address signal output from the processor core, of a physical coordinate position of a destination memory module corresponding to said address signal, and to provide said physical coordinate position for the data packet assembling/parsing unit;
    wherein all fields in the routing table are written or changed in line with the routing configuration instruction; and
    wherein a routing control field in the routing table is written or changed in line with the routing control instruction.

2. The many-core definable distributed shared storage structure according to claim 1, wherein the routing table comprises:
    a plurality of routing lookup rows, each routing lookup row comprises the routing control field, a routing arbitration field, and a routing destination field, wherein the routing control field, the routing arbitration field, and the routing destination field in the routing lookup row are set based on the routing configuration instruction;
    an address arbitration unit, configured to
        for the $n^{th}$ routing lookup row with the routing control field having a valid bit of '1', wherein n=1, 2, 3, . . . , N, wherein N represents the total number of the routing lookup rows with the routing control field having the valid bit of '1':
            subject the address signal output from the processor core and a valid address flag bit of the routing arbitration field of the $n^{th}$ routing lookup row to a bitwise logical operation;
            compare an operational result with a valid address value bit of the routing arbitration field;
            set an address matching flag signal of the $n^{th}$ routing lookup row as '1' in response to consistent comparison; and
            set the address matching flag signal of the $n^{th}$ routing lookup row as '0' in response to inconsistent comparison;
    a priority judgment unit, configured to
        in the case that the address matching flag signal of the $n^{th}$ routing lookup row is '1':
            output a priority flag signal of '10' for the $n^{th}$ routing lookup row, in response to a reading signal output from the processor core and a ping pong reading flag bit both being '1'; or
            output the priority flag signal of '10' for the $n^{th}$ routing lookup row, in response to a writing signal output from the processor core and a ping pong writing flag bit both being '1'; or
            otherwise, output the priority flag signal of '01' for the $n^{th}$ routing lookup row;
        in the case that the address matching flag signal of the $n^{th}$ routing lookup row is '0':
            output the priority flag signal of '00' for the $n^{th}$ routing lookup row,
        wherein the priority flag signal is a 2-bit signal line, where a high bit setting as '1' indicates that the routing destination field of the corresponding routing lookup row is at high priority; a low bit setting as '1' indicates that the routing destination field of the corresponding routing lookup row is at low priority; and an address group matching unit, serving as a combinatory logic unit, configured to compare whether an address group flag bit in the routing control field of each routing lookup row is consistent with a data bit representing an address group in the routing control instruction; and extract routing control field modifying information from the routing control instruction, and output the same to the corresponding routing lookup row, in response to consistent comparison.

3. The many-core definable distributed shared storage structure according to claim 2, wherein the routing control field comprises the valid bit, the address group flag bit, the ping pong reading flag bit, the ping pong writing flag bit, and an ordinary operation flag bit;

in accordance with the routing configuration instruction, the address group flag bits of the routing lookup rows belonging to one same group are set to have a same value;

with a routing table control instruction, these routing lookup rows all are set to be valid or invalid, and modified for the ping pong reading flag bit and the ping pong writing flag bit both; and the routing arbitration field comprises the valid address flag bit and the valid address value bit;

in the case that a certain bit in the valid address flag bit is set as '1', a value of the valid address value bit at the position corresponding to said certain bit is valid, when the address signal output from the processor core is of an address value at said certain bit being consistent with the value of the valid address value bit, a matched address is indicated, and the address signal output from the processor core is in the current routing lookup row, otherwise when the address signal output from the processor core is of an address value at said certain bit being inconsistent with the value of the valid address value bit, an unmatched address is indicated, and the address signal output from the processor core is not in the current routing lookup row;

the routing destination field stores the physical coordinate position of the memory module.

4. The many-core definable distributed shared storage structure according to claim 3, wherein in the routing control field, the valid bit indicates whether the current routing lookup row is valid;

the address group flag bit is configured to unify the memory modules defined by several routing lookup rows into a group of address definition system, for centralized control;

the ping pong reading flag bit and the ping pong writing flag bit are configured to distinguish the physical coordinate position of the destination memory module in the case of a reading access and the physical coordinate position of the destination memory module in the case of a writing access.

5. The many-core definable distributed shared storage structure according to claim 3, wherein the valid address flag bit is of a first bit width consistent with a second bit width of the valid address value bit, for the routing arbitration field.

6. The many-core definable distributed shared storage structure according to claim 5, wherein the valid address flag bit of the routing arbitration field is of the first bit width of 16-bit, 32-bit, or 64-bit; and the valid address value bit of the routing arbitration field is of the second bit width of 16-bit, 32-bit, or 64-bit.

7. The many-core definable distributed shared storage structure according to claim 3, wherein the valid address value bit is of the second bit width consistent with a third bit width of the address signal output from the processor core.

8. The many-core definable distributed shared storage structure according to claim 3, wherein information acquired from the routing table and provided for the data packet assembling/parsing unit further comprises the priority flag signal, wherein in the routing table, the routing destination field in the routing lookup row with the priority flag signal '01' is set as the low bit, while the routing destination field in the routing lookup row with the priority flag signal '10' is set as the high bit; and a destination physical coordinate combination signal is formed and provided for the data packet assembling/parsing unit.

9. The many-core definable distributed shared storage structure according to claim 3, wherein the physical coordinate position stored in the routing destination field is a two-dimensional rectangular coordinate value, in response to the many-core processor being of a two-dimensional topology structure; and the physical coordinate position stored in the routing destination field is a three-dimensional rectangular coordinate value, in response to the many-core processor being of a three-dimensional topology structure.

10. The many-core definable distributed shared storage structure according to claim 3, wherein each routing table comprises a plurality of routing lookup rows definable by a software, and correspondence is established between a processor core access storage address and the destination memory module through the plurality of routing lookup rows, forming the many-core definable distributed shared storage structure.

* * * * *